UNITED STATES PATENT OFFICE.

NILS GENTZEL, OF NEWARK, NEW JERSEY, ASSIGNOR TO K. E. OLSON & SON, INC., OF NORMANDY PLACE, IRVINGTON, NEW JERSEY, A CORPORATION OF NEW JERSEY.

COMPOSITION FOR MAKING METALLIC LEAF.

1,253,956.   Specification of Letters Patent.   Patented Jan. 15, 1918.

No Drawing.   Application filed April 17, 1916. Serial No. 91,795.

*To all whom it may concern:*

Be it known that I, NILS GENTZEL, a citizen of Sweden, and resident of the city of Newark, in the county of Essex and State of New Jersey, have invented certain new and useful Compositions for Making Metallic Leaf, of which the following is a specification.

The present invention relates to the manufacture of an improved film, foil, or leaf made from a composition of matter, and intended as a substitute for the beaten leaf of gold, silver or other metal formerly employed for decorative purposes. For the sake of brevity and conciseness, the product of this invention will be referred to hereinafter simply as an improved artificial metallic leaf.

Generally speaking the object of the invention is to provide an artificial metallic leaf of the character set forth, which shall be easy to prepare, economically produced, readily applicable, faultless in appearance, and possessed of great durability.

Artificial metallic leaves, whenever compounded with a view to strict economy, have heretofore proved to be oftentimes susceptible to disintegration, on account of their unstable nature, which would cause them soon to become streaked with fissures or peel off altogether. In other instances, they are equally notable for their want of adhesiveness or for excessive viscosity. Or else, they will smut, soil the fingers, and eventually disfigure rather than decorate the articles to which they are applied. It is the aim of the present invention to remedy all of these defects, and others likewise objectionable.

The improved artificial metallic leaf constituting the subject matter hereof is the result of three chemical solutions, severally prepared and combined in the manner presently to be described. These solutions will be designated, respectively, by the reference letters "A," "B" and "C."

*Solution "A."*—This solution is prepared first by dissolving one-half ounce of gum-caoutchouc or its equivalent, in twenty-four liquid ounces, that is, one and one-half pints of naphtha. When the mixture is thoroughly dissolved, two ounces of light camphor-oil are added, and also eight ounces, to wit, one-half pint of benzol. Next comes the addition of one-half ounce of naphthalene, and one-half ounce of flowers of sulfur. The mass is then stirred continuously until worked up to a smooth and syrupy consistency.

*Solution "B."*—Four ounces are taken of the above described solution "A," and mixed with one ounce of naphtha. Then one ounce of benzol is poured into the mixture, and next is introduced one ounce of a ceresin solution, which latter was previously produced by steeping one quarter ounce of ceresin wax in sixteen ounces (one pint) of benzol, or in lieu of the wax, a gum such as mastic may be employed.

*Solution "C."*—The latter named solution is made by mixing two and one-quarter ounces of either nitrated cellulose, soluble nitrated cotton, pyroxylin or gun cotton dissolved in ethyl-alcohol, with two and one-quarter ounces of amyl-acetate, and two ounces of benzol.

The said solution "C" is poured into the before mentioned solution "B", and the two solutions are caused to commingle perfectly, through constant agitation. Finally, there is added to this mixture, approximately one ounce and three quarters of powdered bronze or other coloring metallic powder or pigment, which is intimately incorporated in order to impart to the composition the desired metallic appearance.

Of the above enumerated solid ingredients, the gum caoutchouc constitutes the foundation for the structure of the artificial metallic leaf. Its inherent qualities enable it to produce a binding material for the other constituents of the leaf, well adapted for the purpose by reason of its cohesiveness and power of resistance. The naphthalene is added to remove the superfluous stickiness which the gum might otherwise retain. On the other hand, the flowers of sulfur enhance the tenacity of the gum, while the ceresin wax affords a filler serving to effect a close texture. The soluble nitrated cotton is employed to protect the bronze and prevent discoloration thereof by the gum-caoutchouc. As to the liquid ingredients, their adaptability to act as solvents is familiarly known to experts in the art, though it may not be amiss to point out that the camphor-oil used as hereinbefore described, will accelerate the dissolving of the gum. It should also be understood that several substitutes may be employed in lieu of the various ingredients specified, whether or not the same be classed as primary substances, or merely derivatives. The invention, therefore, is not restricted in this or any similar respect.

In forming leaves from the triple solution herein disclosed, the dissolved compounded matter is placed in a shallow trough or rimmed tray, wherein a metallic cylinder or wheel is arranged to revolve in such a way that its under surface will dip in lightly and take up said matter as the rotatable body is kept turning. The surface may be previously coated, if desired, with some suitable substance to enable it the more readily to relinquish its hold upon the composition, when the latter has been sufficiently evaporated. As soon as the required degree of evaporation has been reached, the leaf can be detached at once from the surface of the wheel or cylinder simply by scoring its surface, when the leaf will readily peel off and can be collected in the usual manner. No illustration is given of the apparatus just spoken of for the forming of leaves, as the like is well known in the art, and besides, there are other devices equally available for converting the mass of dissolved matter described into the requisite form of film, foil, or leaf.

Having described my invention, what I desire to secure by Letters Patent, and claim is:—

1. A composition for making metallic leaf including dissolved caoutchouc, coloring metallic powder, and soluble nitrated cotton.

2. A composition for making metallic leaf including naphthalene, dissolved caoutchouc, coloring metallic powder, and soluble nitrated cotton.

3. A composition for making metallic leaf including dissolved caoutchouc, naphthalene, flowers of sulfur, soluble nitrated cotton, and coloring metallic powder.

4. A composition for making metallic leaf including dissolved caoutchouc, naphthalene, flowers of sulfur, ceresin, coloring metallic powder, and a minor portion of soluble nitrated cotton.

5. A composition for making metallic leaf including gum-caoutchouc, naphthalene, pulverulent sulfur, naphtha, camphor oil, soluble nitrated cotton, and ceresin.

Signed at the borough of Manhattan, in the county of New York and State of New York, this 7th day of April, A. D. 1916.

NILS GENTZEL.

Witnesses:
J. BUCKRIDGE,
DAVID GRANT.